(12) United States Patent
Quennehen et al.

(10) Patent No.: US 11,391,170 B2
(45) Date of Patent: Jul. 19, 2022

(54) LOAD-BEARING CMC NOZZLE DIAPHRAGM

(71) Applicant: SAFRAN AIRCRAFT ENGINES, Paris (FR)

(72) Inventors: Lucien Henri Jacques Quennehen, Moissy-Cramayel (FR); Antoine Claude Michel Etienne Danis, Moissy-Cramayel (FR); Clément Jean Pierre Duffau, Moissy-Cramayel (FR); Clément Jarrossay, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/047,224

(22) PCT Filed: Apr. 17, 2019

(86) PCT No.: PCT/FR2019/050914
§ 371 (c)(1),
(2) Date: Oct. 13, 2020

(87) PCT Pub. No.: WO2019/202259
PCT Pub. Date: Oct. 24, 2019

(65) Prior Publication Data
US 2021/0172330 A1    Jun. 10, 2021

(30) Foreign Application Priority Data

Apr. 17, 2018 (FR) ...................................... 1853345

(51) Int. Cl.
*F01D 9/04* (2006.01)
*F01D 5/28* (2006.01)
(Continued)

(52) U.S. Cl.
CPC ............. *F01D 9/042* (2013.01); *F01D 5/282* (2013.01); *F01D 25/12* (2013.01); *F01D 25/246* (2013.01);
(Continued)

(58) Field of Classification Search
CPC .................................. F01D 9/04; F01D 9/042
See application file for complete search history.

(56) References Cited

U.S. PATENT DOCUMENTS 4,396,349 A * 8/1983 Hueber ................... F01D 5/284
415/115
6,164,903 A * 12/2000 Kouris ...................... F01D 9/04
415/135
(Continued)

FOREIGN PATENT DOCUMENTS

EP    3 009 601 A1    4/2016
FR    2 973 435 A1    10/2012
(Continued)

OTHER PUBLICATIONS

International Search Report dated Nov. 25, 2019 in PCT/FR2019/050914 filed on Apr. 17, 2019, 2 pages.
(Continued)

*Primary Examiner* — Christopher Verdier
*Assistant Examiner* — Cameron A Corday
(74) *Attorney, Agent, or Firm* — Oblon, McClelland, Maier & Neustadt, L.L.P.

(57) ABSTRACT

A turbine of a turbo engine including a casing and a turbine nozzle stage, the turbine nozzle stage including an outer metal shroud secured to the casing, an inner metal shroud, and a plurality of ring sectors made of ceramic-matrix composite material forming a crown extending between the outer metal shroud and the inner metal shroud and having an internal shroud and an external shroud, each ring sector
(Continued)

having an internal platform forming a portion of the internal shroud, an external platform forming a portion of the external shroud, and at least one blade extending between the external platform and the internal platform and secured thereto. Each sector is fixed to the outer metal shroud using at least one assembly including a screw and a nut, the screw passing through the outer platform of the sector and the outer metal shroud.

11 Claims, 8 Drawing Sheets

(51) Int. Cl.
    *F01D 25/12* (2006.01)
    *F01D 25/24* (2006.01)

(52) U.S. Cl.
    CPC ...... *F05D 2220/30* (2013.01); *F05D 2240/14* (2013.01); *F05D 2260/31* (2013.01)

(56) References Cited

U.S. PATENT DOCUMENTS

| | | | |
|---|---|---|---|
| 2010/0132374 A1* | 6/2010 | Manteiga | F01D 9/02 60/796 |
| 2012/0251309 A1 | 10/2012 | Beaujard et al. | |
| 2012/0251314 A1* | 10/2012 | Beaujard | F01D 9/065 415/209.3 |
| 2014/0234118 A1 | 8/2014 | Beaujard et al. | |
| 2014/0356151 A1 | 12/2014 | Fremont et al. | |
| 2016/0090851 A1 | 3/2016 | Carr et al. | |
| 2019/0093490 A1 | 3/2019 | Carr et al. | |

FOREIGN PATENT DOCUMENTS

| | | |
|---|---|---|
| WO | WO 2012/146875 A1 | 11/2012 |
| WO | WO 2013/079859 A1 | 6/2013 |

OTHER PUBLICATIONS

French Preliminary Search Report dated Dec. 17, 2018 in French Application 1853345 filed on Apr. 17, 2018, 2 pages.

* cited by examiner

LOAD-BEARING CMC NOZZLE DIAPHRAGM

BACKGROUND OF THE INVENTION

The invention relates to turbo engines, in particular aeronautical turbine engines or industrial turbines, and more particularly a turbine nozzle stage made of ceramic-matrix or at least partially ceramic-matrix composite material, hereinafter referred to as CMC material.

The field of application of the invention is in particular that of aeronautical gas turbine engines. The invention is however applicable to other turbo engines, for example industrial turbines.

The improvement of the performances of turbo engines and the reduction of their pollutant emissions leads to consider increasingly higher operating temperatures.

For elements of hot portions of turbo engines, it has therefore been proposed to use ceramic-matrix composite materials noted CMC thereafter.

The CMC materials are typically formed from a fibrous reinforcement made of refractory fibers, such as carbon or ceramic fibers, densified by a ceramic or at least partially ceramic matrix.

These materials have remarkable thermo-structural properties, that is to say mechanical properties which make them capable of constituting structural elements and the ability to maintain these properties at high temperatures. In addition, CMC materials have a density much lower than that of the metal materials traditionally used for elements of hot portions of turbo engines.

Thus, the documents WO 2010/061140, WO 2010/116066 and WO 2011/080443 describe the production of vanes of movable wheels of turbo engines made of CMC with integrated platform and heel. The use of CMC materials for turbine nozzles has also been proposed, in particular in documents WO 2010/146288, FR 2 979 662 and EP 2 443 318.

A traditional metal turbine nozzle stage has a crown shape made up of several assembled sectors, each sector comprising an internal platform, an external platform and a plurality of blades extending between the internal and external platforms and secured thereto. The juxtaposed internal platforms form an internal shroud and the juxtaposed external platforms form an external shroud. The internal and external shrouds delimit the gas flowpath in the nozzle stage.

Introducing a nozzle stage, for example a high-pressure nozzle stage, made of CMC allows increasing the maximum tolerated temperature compared to a metal nozzle stage, and thus decreasing the amount of cooling air used. This allows thus enhancing the performances of the turbo engine.

However, the CMC, by its properties very different from metal, is more sensitive to some mechanical stresses. Indeed, the CMC has greater rigidity and lower expansion. It behaves better in compression, but its admissible tensile stresses are lower than those of metal.

In addition, the integration of a CMC part into a metallic environment is difficult because of the differential thermal expansions between CMC and metal. This is all the more difficult in a turbo engine, and more particularly in a high-pressure portion of the turbo engine, because the environment is very hot, which increases the differences in the coefficients of thermal expansion between the materials, the aerodynamic forces undergone by a high-pressure nozzle stage being also very high in this turbine area.

CMC nozzle stages are known, such as for example a turbine nozzle stage including an outer support shroud secured to a casing, an inner support shroud, and a plurality of CMC ring sectors forming a crown extending between the outer support shroud and the inner support shroud. Each ring sector is bearing on the inner and outer support shrouds and includes an internal platform, an external platform, and at least one blade extending between the external platform and the internal platform and secured thereto.

However, there is a need to improve the known solutions regarding the deterministic securing of the CMC ring sector with the inner shroud, in particular in terms of at least axial holding of the ring sector and in terms of take-up of the aerodynamic forces.

In addition, a significant pressure differential is exerted on the casing under the nozzle stage in the radial direction. This casing is used to create a sealing between the rotor and the stator. This pressure variation is a source of a force which, if it were exerted on the CMC, would be too high given the admissible agents of the material.

There is also known a nozzle stage as described above and further including a reinforcing mast extending radially inside the vanes between the two platforms.

However, such a solution takes up both, via the mast, the forces relating to the pressure differential under the nozzle stage and the aerodynamic forces on the CMC crown. There is therefore a need to improve the deterministic holding of the CMC part of this solution.

OBJECT AND SUMMARY OF THE INVENTION

The invention aims at overcoming the drawbacks mentioned above and at overcoming the difficulties mentioned above by proposing a turbine of a turbo engine comprising a turbine nozzle stage at least partly made of CMC whose mounting is simplified and adapted to hold the ring sectors in a deterministic manner while allowing the ring sector to be deformed independently of the metal parts at the interface.

An object of the invention proposes a turbine of a turbo engine comprising a casing and a turbine nozzle stage, the turbine nozzle stage including an outer support shroud made of metal and secured to the casing, an inner support shroud made of metal, and a plurality of ring sectors made of ceramic-matrix composite material forming a crown and extending between the outer support shroud and the inner support shroud and having an internal shroud and an external shroud forming therebetween a fluid flowpath, the crown defining an axial direction and a radial direction. Each ring sector has an internal platform forming a portion of the internal shroud, an external platform forming a portion of the external shroud, and at least one blade extending between the external platform and the internal platform, said at least one blade being secured to the internal and external platforms. The external platform of each sector comprises a first portion equipped with an inner face forming the outer surface of the fluid flowpath, and a second portion radially distant and external to the first portion, the second portion of the external platform being fixed to the outer support shroud.

According to a general characteristic of the invention, the internal platform comprises a first tab protruding along the radial direction inwardly from an upstream axial end of the internal platform, and the inner support shroud comprises a shoulder protruding in the radial direction outwardly, the shoulder being positioned upstream of the first tab and in abutment in the axial direction against said first tab.

The fixing of the CMC ring sector to the outer support shroud made of metal allows taking up the forces of gases exerted on the blade and the platforms. This system, which thus comprises a radial fixing of the CMC ring sector to an outer metal support shroud as well as an axial holding to an element of the support structure comprising the outer shroud and the inner shroud, thus allows having a deterministic holding of the nozzle on the casing, which allows better controlling the positioning and the displacements, and therefore, the clearances, which are crucial for the performance of the engine.

In a first aspect of the turbine, the turbine may further comprise at least one reinforcement disposed along the radial direction between the first portion and the second portion of the external platform, said at least one reinforcement comprising a first wall bearing against a radially outer face of the first portion and a second wall bearing against a radially inner face of the second portion, at least one reinforcement being fixed to the outer support shroud with the second portion of the external platform.

The region extending radially between the first portion and the second portion is the most mechanically loaded, the lever arm of the pressure forces being maximum therein. The reinforcement forms a thickening of the platform in this region which allows stiffening it and lowering the stresses exerted therein.

In a second aspect of the turbine, the second portion of the external platform can be fixed to the outer support shroud using at least one assembly comprising a screw and a nut, the screw passing through the external platform of the sector and the outer support shroud.

In a third aspect of the turbine, the second portion of the external platform of each sector can comprise at least one rotational abutment element and the outer support shroud can comprise at least one complementary rotational abutment element configured to cooperate with a rotational abutment element of the external platform.

The rotational abutment thus makes it easier to position and assemble the nozzle stage and to take up the moment around the radial axis.

The rotational abutment can be formed by an orifice in the second portion of the external platform of each sector and, for each external platform orifice, a centering lug radially protruding inwardly from the outer metal shroud, the centering lugs being configured to each cooperate with an external platform orifice to maintain the sector in position in an axial direction and a circumferential direction of the nozzle stage.

Alternatively, the rotational abutment may be formed by a notch provided in the second portion of the external platform of each ring sector and an abutment protruding radially inwardly from the outer metal shroud and configured for cooperate with one of said notches.

In a fourth aspect of the turbine, the first portion of the external platform may comprise a portion protruding outwardly in the radial direction from an upstream end of the external platform.

Said radial portion thus allows improving the sealing of the fluid flowpath.

In a fifth aspect of the turbine, said at least one blade of each ring sector has a hollow profile defining an inner housing extending between the internal platform and the external platform, the internal and external platforms of each ring sector each have an orifice communicating with said inner housing of said at least one blade, and each ring sector of the nozzle stage comprises at least one mast passing through said orifices of the platforms and the inner housing of said at least one blade, said mast being fixed to said casing and in connection with said ring sector and said inner support shroud, the connection being able to be direct or indirect.

As mentioned above, an additional difficulty is generated by the pressure differential between the upstream and the downstream of the internal platform of the nozzle stage and the casing attached thereto. This casing is used to create a sealing between the rotor and the stator. The pressure difference can reach a value between 2 to 50 bars. This creates a significant force which is a source of significant stresses, in particular in the gripping area, by generating a moment via the lever arm which is the blade. This pressure variation is a source of a force which, if it was exerted on the CMC, would be too high taking into account the admissible agents of the material.

The mast allows providing a means for fixing a ring sector of a CMC nozzle stage from above, that is to say to the casing, while minimizing the bending moment, insofar as the bending length is reduced by about half due to the mast passing through the annular sector, the force being already greatly reduced due to the fact that the nozzle stage according to the invention does not take up the force linked to the difference in pressure on the inner shroud.

Each ring sector of the nozzle stage is thus maintained in a deterministic manner, that is to say so as to prevent the ring sector from vibrating and controlling its position, and this while allowing the ring sector to be deformed under the effects of temperature and pressure, inter alia independently of the metal parts at the interface.

The turbine according to the invention thus allows having a nozzle stage taking up the pressure differential forces in the flowpath on the blade not by the CMC elements, but by the metal mast which benefits from a better admissible agent than the CMC elements.

In an sixth aspect of the turbine, the mast may comprise at least one protruding portion extending in a plane transverse to the radial direction along which the mast extends and in connection with the blade to hold the blade in position.

The sleeve defines a ball joint making it possible to minimize the force due to the aerodynamic moment without modifying the integration of the ring sector in the turbine. Indeed, the ball joint thus formed inside the blade lets the blade free to move about the axis defined by the mast.

In a seventh aspect of the turbine, the internal platform of each sector may further comprise a second radial tab protruding in the radial direction inwardly from a downstream end of the internal platform, the internal platform being fixed to the inner support shroud by pinching of the first and second radial tabs of the internal platform in the axial direction between said shoulder of the inner support shroud and a clamp including two jaws extending in the radial direction outwardly and held under stress towards each other against the second radial tab of the internal platform.

Alternatively, the inner support shroud may comprise a perforated crown including orifices for receiving one end of the mast, and a retaining ring on which the crown is mounted.

In an eighth aspect of the turbine, the mast may be hollow and comprise perforations over its entire height to deliver a cooling air stream, the air stream being conveyed inside the mast from the casing.

The mast can be made of metal material so as to offer good mechanical strength, the mast taking up all the aerodynamic forces to transfer them to the casing.

The mast can be made of any other material.

Each ring sector can comprise a plurality of blades at least one of them comprises a mast.

In a ninth aspect of the turbine, the second portion of the external platform, the blade and the first tab of the internal platform are formed in a single and same weaving part of ceramic-matrix composite material, which allows strengthening the structure of the ring sector.

The object of the invention is also a turbo engine comprising at least one turbine of a turbo engine as defined above.

Another object of the invention is also an aircraft comprising at least one turbo engine as defined above.

BRIEF DESCRIPTION OF THE DRAWINGS

The invention will be better understood upon reading the following, as indication but without limitation, with reference to the appended drawings wherein.

DETAILED DESCRIPTION OF EMBODIMENTS

Figure 1:
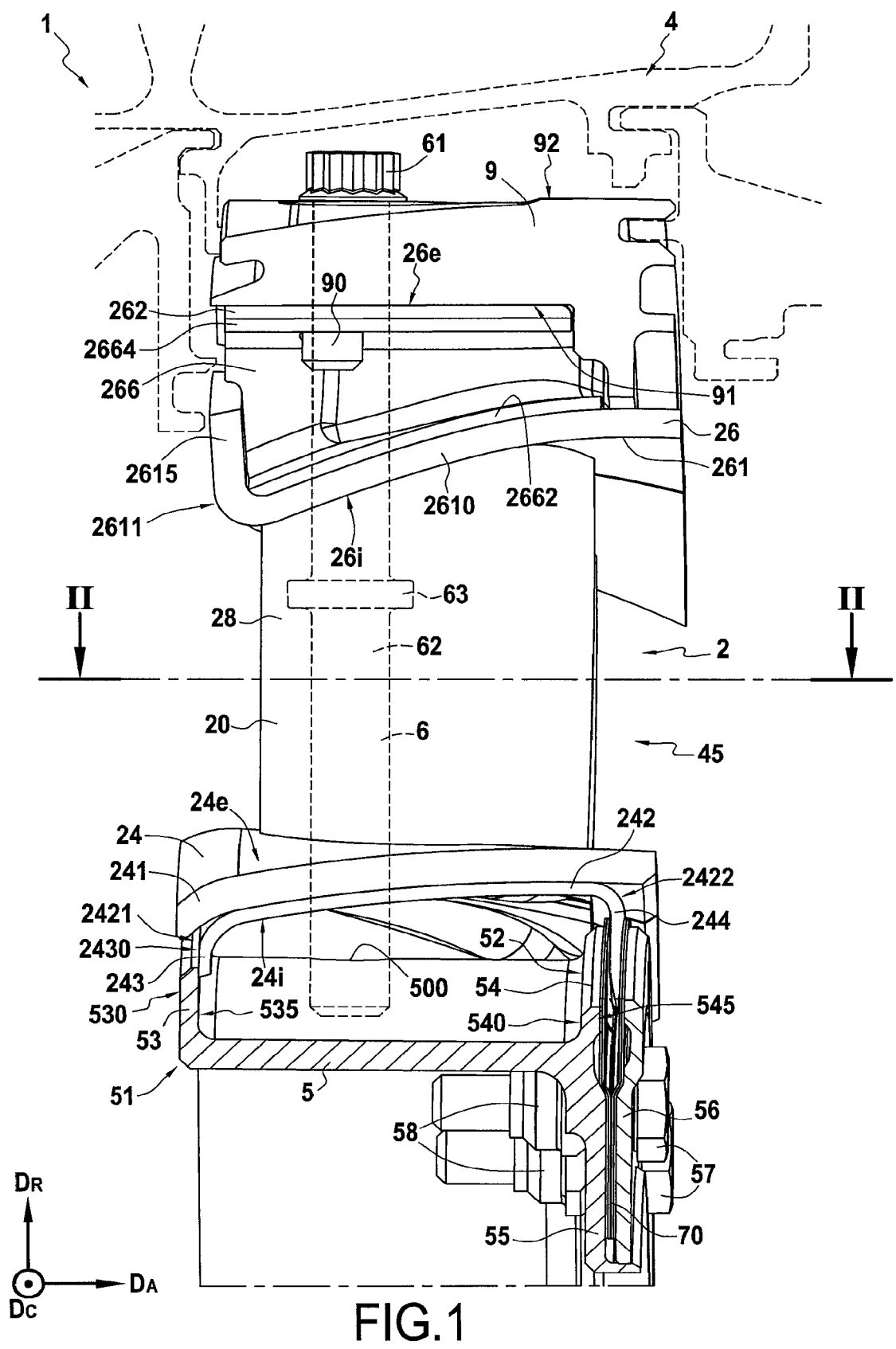
FIG. 1 is a schematic view of a ring sector of a nozzle stage in a plane defined by the radial direction and the axial direction of the ring according to a first embodiment of the invention.

FIG. 1 illustrates a schematic view of a ring sector of a nozzle stage in a plane defined by the radial direction and the axial direction of the nozzle stage according to a first embodiment of the invention.

Figure 2:
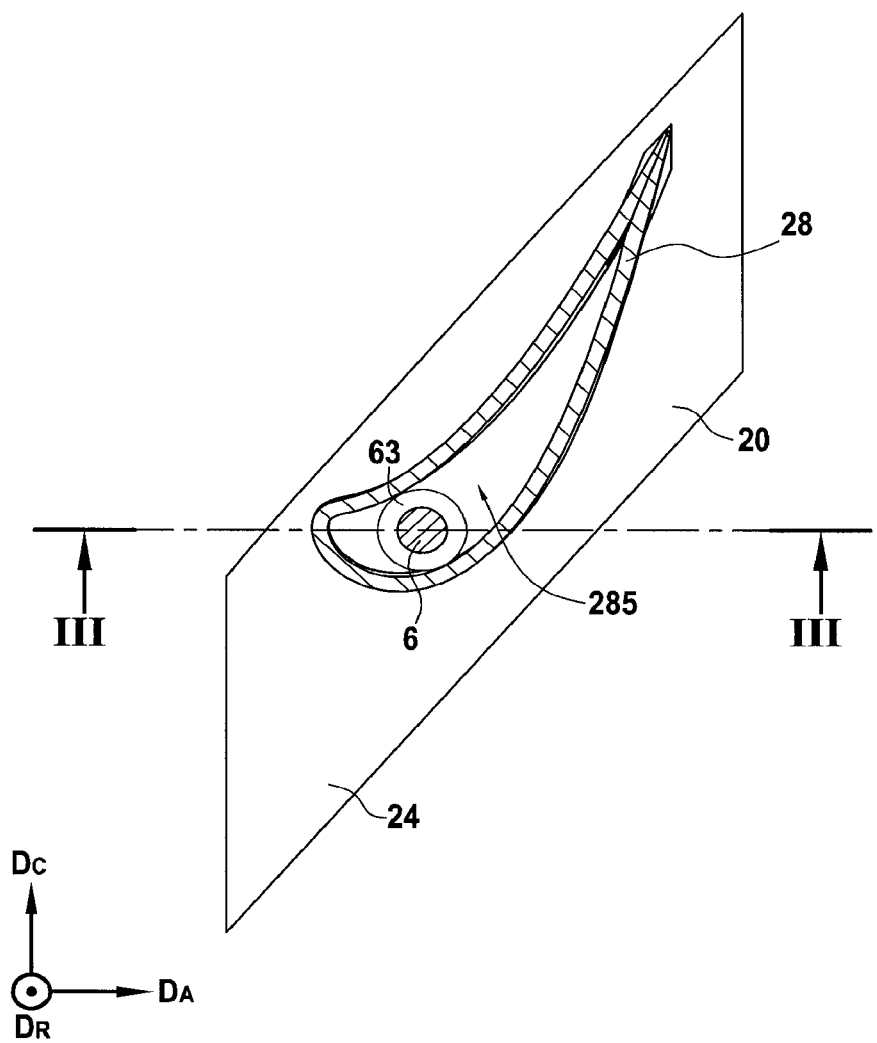
FIG. 2 shows a sectional view of the ring sector of FIG. 1 in a plane defined by the axial direction and the circumferential direction of the nozzle stage.
Figure 3:
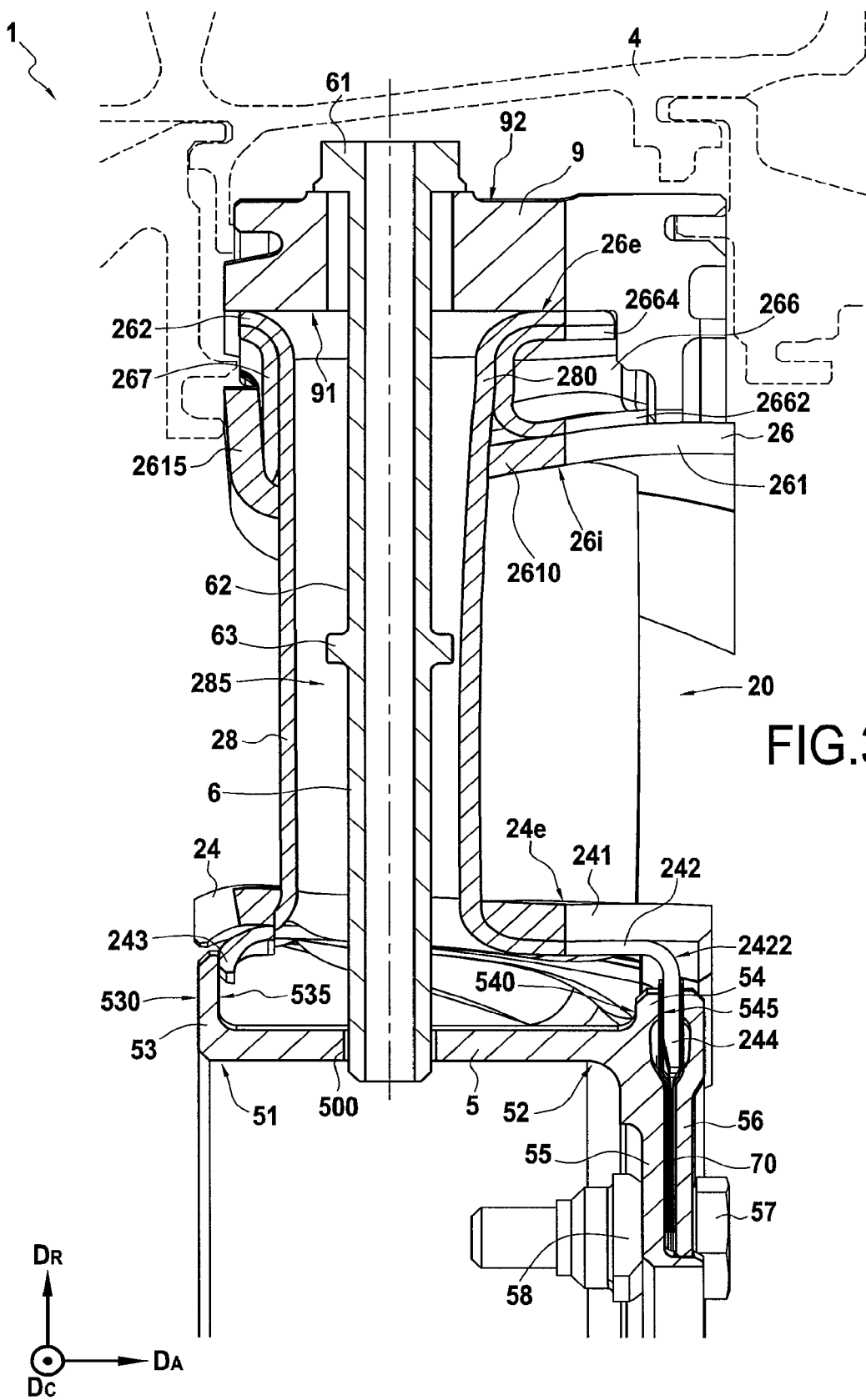
FIG. 3 shows a schematic sectional view of the ring sector of FIG. 1 in a plane defined by the radial direction and the axial direction.
Figure 4:
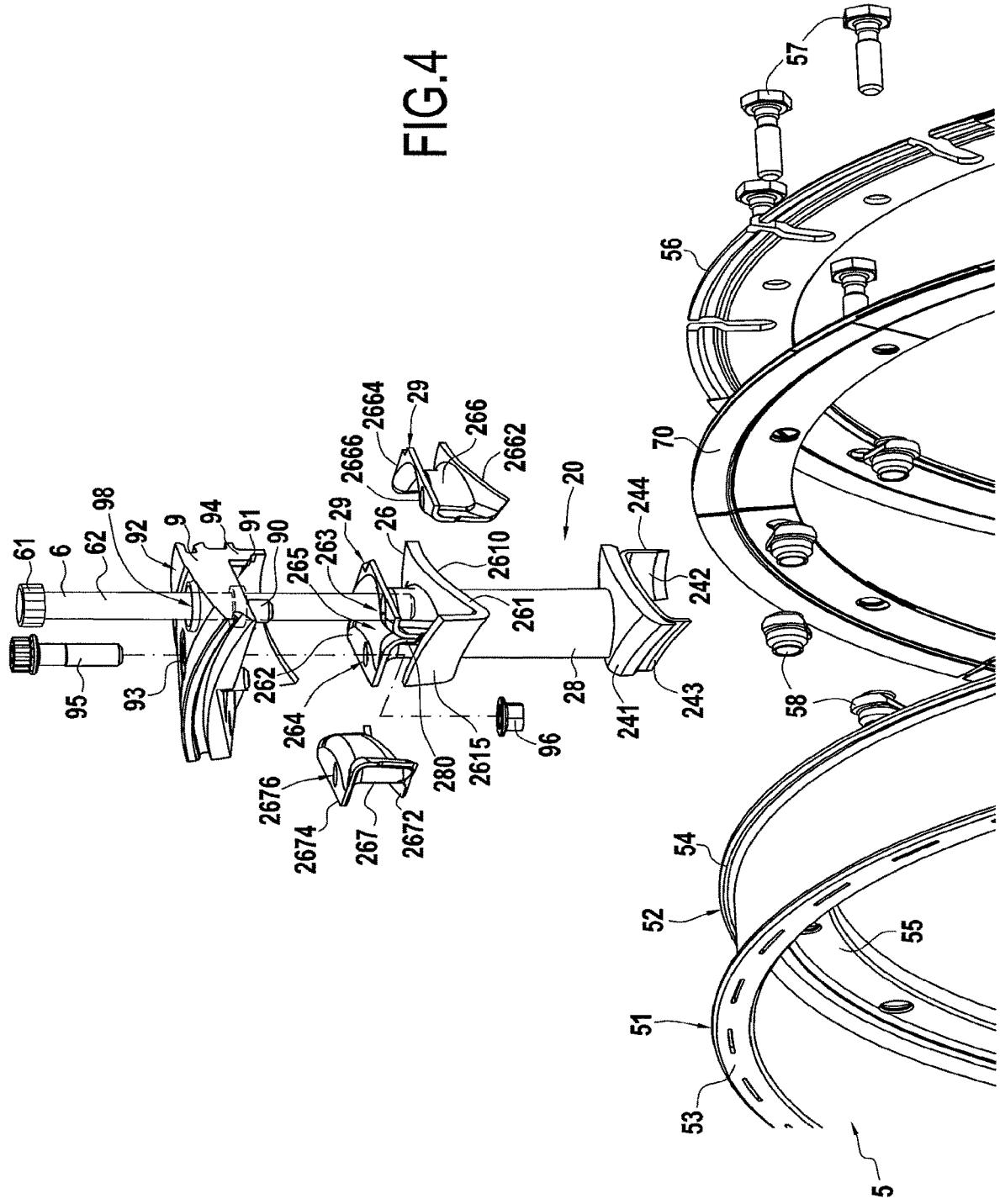
FIG. 4 is an exploded schematic view of the ring sector of FIG. 1.

FIGS. 2 to 4 show respectively a sectional view in a plane defined by the axial direction and the circumferential direction, a schematic sectional view in a plane defined by the radial direction and the axial direction and an exploded schematic view of the ring sector of FIG. 1.

A high-pressure turbine 1 of a turbo engine, for example an aeronautical turbine engine, as shown partially in FIG. 1, comprises a plurality of fixed nozzle stages 2 which alternate with movable wheels in the flow direction, indicated by an arrow in FIG. 1, of the gas stream F in the turbine 1 and which are mounted in a turbine casing 4.

Each movable wheel comprises a plurality of vanes having an internal shroud, and at least one blade extending from the internal shroud and linked thereto. On the internal side of the internal shroud, the vane is extended by a root engaged in a housing of a disc. On the external side, the tips of the vanes is facing an abradable material carried by a ring to ensure the sealing of the tips of the vanes.

Throughout the present text, the terms "internal" or "inner" and "external" or "outer" are used with reference to the position or the orientation with respect to the axis of rotation of the turbine 1 which defines the axial direction $D_A$ of the turbine 1.

The vanes of the movable wheel can be traditional metal vanes or vanes made of CMC material obtained for example as described in documents WO 2010/061140, WO 2010/116066, WO 2011/080443.

At least one of the nozzle stages 2 of the turbine 1 is formed by joining together several ring sectors 20 made of CMC material to form a complete ring. The arrow $D_A$ indicates the axial direction of the nozzle stage 2 while the arrow $D_R$ indicates the radial direction of the nozzle stage 2.

Each ring sector 20 of the nozzle stage 2 comprises an internal platform 24, an external platform 26 and a blade 28 extending between the internal and external platforms 24 and 26 and secured thereto. Alternatively, several blades could extend between the internal and external platforms of the same nozzle sector. Once assembled with the casing 4 of the turbine 1, the sectors 20 form a single nozzle crown 2 having an internal shroud formed by the juxtaposition of the internal platforms 24 of the sectors 20 and an external shroud formed by the juxtaposition of the external platforms 26 of the sectors 20.

The internal shroud and the external shroud form therebetween a fluid flowpath 45 inside which the gas stream F flows during the operation of the turbine 1.

Throughout the text, the terms "upstream" and "downstream" are used with reference to the flow direction of gas stream F in the flowpath 45 indicated by an arrow.

The internal platforms 24 forming the internal shroud of the nozzle stage 2 each comprise a first portion 241 and a second portion 242 in contact with each other and secured to the ring sector 20. The first and second portions 241 and 242 can be molded together or woven together or secured together differently during the consolidation through gaseous process or during the infiltration operation called "Melt Infiltration" of the ring sector and corresponding to a rise of silicon through liquid process thanks to the capillarity within the textile.

The internal platforms 24 each have an external surface 24e intended to be in contact with the gas stream F and formed by the surface of the first portion 241 of the internal platforms 24 oriented radially outwardly, and therefore disposed radially facing the external platforms 26 forming the external shroud. The internal platforms 24 further have an internal surface 24i disposed facing the axis of rotation of the turbine 1, and formed by the surface of the second portion 242 of the internal platforms 24 oriented radially inwardly.

The external platforms 26 each comprise a first portion 261 and a second portion 262 secured to the ring sector 20. The first and second portions 261 and 262 of the external platforms 26 can be molded or woven or secured to the ring sector 20 during its design. The external platforms 26 each have an external surface 26e disposed facing the casing 4 and formed by the surface of the second portion 262 of the external platforms 26 oriented radially outwardly. The external platforms 26 further have an internal surface 26i intended to be in contact with the gas stream F and formed by the surface of the first portion 261 of the external platforms 26 oriented radially inwardly, and therefore disposed radially facing the internal platforms 24 forming the internal shroud and facing the axis of rotation of the turbine 1.

As the sectors 20 form the nozzle stage 2, the internal platform 24 of each sector 20 therefore has a portion of the external surface and a portion of the internal surface of the external shroud, and the external platform 26 of each sector 20 also has a portion of the external surface and a portion of the internal surface of the internal shroud. The blade 28 of each sector 20 extends between the external surface 24e of the internal platform 24 of the ring sector 20 and the internal surface 26i of the external platform 26 of the ring sector 20, and an extension 280 of the blade 28 also extends between the first portion 261 and the second portion 262 of the external platform 26.

The rectifier stage 2 further comprises an inner metal shroud 5 and an outer metal shroud 9 between which extends the crown formed by the assembly of the ring sectors 20 of the nozzle stage 2. The inner metal shroud 5 is secured to the casing 4.

The inner metal shroud 5 has an annular portion extending in the axial direction $D_A$ and in the circumferential direction $D_C$ and comprising at each end 51 and 52 along the axial direction $D_A$, that is to say at an upstream end 51 and a downstream end 52, an upstream attachment tab 53 and a downstream attachment tab 54 extending in the radial direction $D_R$ outwardly, that is to say towards the internal platform 24, and more particularly its internal surface 24i, of the ring sector crown 20, and towards the outer metal shroud 9.

The second portion 242 of the internal platform 24 of the ring sector 20 has, in the axial direction $D_A$, an upstream end 2421 and a downstream end 2422 each having a tab 243 and 244 protruding in the radial direction $D_R$ inwardly.

The upstream attachment tab 53 has an upstream surface 530 and a downstream surface 535, the downstream surface 535 bears against the upstream end 2421 of the second portion 242 of the internal platform 24 of the ring sector 20, and more particularly against an upstream surface 2430 of the upstream tab 243 protruding from the upstream end 241 of the internal platform 24.

The inner metal shroud 5 further comprises a portion 55 protruding in the radial direction $D_R$ inwardly in the extension of the downstream attachment tab 54. The protruding portion 55 and the downstream attachment tab 54 are in the same radial plane defined by the radial direction $D_R$ and the circumferential direction $D_C$.

The downstream attachment tab 54 has an upstream surface 540 and a downstream surface 545. The downstream surface 545 is bearing against the downstream tab 244 formed at the downstream end 242 of the internal platform 24 of the ring sector 20.

To hold the internal platform 24 in position, the inner metal shroud 5 further comprises a locking ring 56 which can be made in one piece or be circumferentially sectored. The locking ring 56 comprises a planar surface extending in the radial direction $D_R$. The locking ring 56 is fixed using screws 57 and nuts 58, the screws 55 each passing through the locking ring 56 and the protruding portion 55 radially inwardly of the inner metal shroud 5 via two coaxial holes made respectively in the locking ring 56 and in the protruding portion 55 radially inwardly of the inner metal shroud 5.

The inner metal shroud 5 is configured so that the clamping of the locking ring 56 against the protruding portion 55 radially inwardly of the inner metal shroud 5 via the nut 58 and the screw 57 allow sandwiching the downstream tab 244 protruding radially from the downstream end 242 of the internal platform 24 of the ring sector 20 between two jaws formed by the downstream attachment tab 54, on the one hand, and the locking ring 56 on the other hand.

The internal platform 24, and more particularly its second portion 242, is thus sandwiched in the axial direction $D_A$ using an axial clamp of the inner support metal shroud 5 formed by the upstream attachment tab 53 and the assembly formed of the downstream attachment tab 54 and the locking ring 56. This configuration allows applying a downstream axial stress to each ring sector 20 to hold axially in position the ring sectors 20.

In addition, in the first embodiment illustrated in FIGS. 1 to 4, the inner metal shroud 5 comprises an annular seal 70 shaped to be interposed between the downstream attachment tab 54 and the downstream tab 244, between the downstream tab 244 and the locking ring 56, and between the portion 55 protruding radially inwardly and the locking ring 56.

The outer metal shroud 9 comprises a centering lug 90 for each ring sector 20. The lug 90 is in the form of a pin fixed or secured to the outer metal shroud 9. The outer metal shroud 9 has an internal surface 91 and an external surface 92 along the radial direction $D_R$. The lug 90 extends from the internal surface 91 in the radial direction $D_R$ inwardly.

The second portion 262 of the external platform 26 of the ring sector 20 comprises a first orifice 263 configured to cooperate with a centering lug 90 of the outer metal shroud 9. When the rectifier stage 2 is assembled, the external surface 26e of the external platform 26 of the ring sector 20 is bearing against the internal surface 91 of the outer metal shroud 9 and the centering lug 90 passes through the corresponding orifice of the outer metal shroud 9 and the first orifice 263 of the second portion 262 of the external platform 26.

In addition, to secure the ring sector 20 to the outer metal shroud 9, the second portion 262 of the external platform 26 of the ring sector comprises a second orifice 264 intended to cooperate with a screw 95 passing through the outer metal shroud 9 through a first orifice 93 of the outer metal shroud 9 and the second orifice 264 of the second portion 262 of the external platform 26 of the ring sector 20. The screw 95 cooperates with a nut 96 to secure the outer metal shroud 9 and the ring sector 20 together.

The screw 95 and the lug 90 of the same ring sector 20 are disposed on either side of the extension 280 of the vane 28 of the ring sector 20 to improve the blocking of the ring sector about a radial axis. Likewise, the second orifice 264 and the first orifice 263 of the second portion 262 of the internal platform 26 are disposed on either side of the extension 280 of the vane 28 of the ring sector 20.

As illustrated in FIG. 2, each blade 28 has a hollow profile having an internal housing 285 extending over the entire height of the blade 28, that is to say between the internal platform 24 and the external platform 26 of the ring sector 20. The internal platform 24 of each ring sector 20 comprises an orifice 245 whose shape corresponds to the section of the internal housing 285 in the plane in which the internal platform 24 extends. Similarly, the external platform 26 of each ring sector 20 comprises an orifice 265 whose shape corresponds to the section of the internal housing 285 in the plane in which the internal platform 26 extends. The orifices 245 and 265 of the internal 24 and external 26 platforms are made in the extension of the internal housing 285 of the blade 28.

The internal housing 285 of the blade 28 and the orifices 245 and 265 of the internal 24 and external 26 platforms can be connected to a cooling system delivering a cooling air stream from the casing 4 up to the blade 28 and the internal 24 and external 26 platforms.

As illustrated in FIGS. 1 to 4, the turbine 1 further comprises, for each ring sector 20, a mast 6 extending in the radial direction $D_R$. The mast 6 comprises a mast head 61 bearing on the external surface 92 of the outer metal shroud 9, and a rod 62 protruding from the head 61 in the radial direction $D_R$ inwardly and configured to pass through the outer metal shroud 9, the internal housing 285 of the blade 28 and the orifices 245 and 265 of the internal 24 and external 26 platforms being aligned with the internal housing 285 of the blade 28.

The mast 6 further comprises a protruding portion 63 extending in a plane transverse to the radial direction $D_R$ along which the mast 6 extends. In the illustrated embodiment, the protruding portion 63 of the mast 6 forms an annular shoulder extending over a portion of the mast 6 intended to be in the internal housing 285 of the blade 28. The protruding portion 63 of the mast 6 forms a protrusion at least one portion of which is in contact with the blade 28 to hold the blade 28 in position.

In addition, the inner support shroud 5 comprises orifices 500 configured to receive the masts 6. The mast 6 allows providing a means for fixing the CMC ring sector 20 from above, that is to say to the casing 4, while minimizing the bending moment, insofar as the bending length is reduced by about half due to the mast 6 passing through the annular sector. Each ring sector 20 of the nozzle stage is thus held in a deterministic manner, that is to say so as to prevent the ring sector 20 from vibrating and by controlling its position, and this while allowing the ring sector 20 to be deformed under the effects of the temperature and of the pressure inter alia independently of the metal parts at the interface.

In the case where each ring sector comprised several blades, the turbine would comprise, at most, a corresponding number of masts for each nozzle ring sector.

In the embodiment illustrated in FIGS. 1 to 4, the external platform 26 of the ring sector 20 further comprises a first and a second reinforcement 266 and 267 disposed on either side of the blade 28 extension 280 and radially between the first portion 261 and the second portion 262 of the external platform 26. Each of the two reinforcements 266 and 267 comprises a first wall, respectively 2662 and 2672, bearing against a radially outer face of the first portion 261 of the outer platform 26, that is to say the face of the first portion 261 facing the second portion 262 of the external platform 26, and a second wall, respectively 2664 and 2674, bearing against a radially inner face of the second portion 262 of the outer platform 26, that is to say the face of the second portion 262 facing the first portion 261 of the external platform 26.

Each reinforcement 266 and 267 further comprises a central wall, respectively 2668 and 2678, extending between the first wall, 2662 and 2672, and the second wall 2664 and 2674 of the corresponding reinforcement, 266, 267. The central walls 2668 and 2678 extend mainly in the radial direction $D_R$. Each reinforcement 266 and 267 thus has a U shape in a section plane comprising the radial direction $D_R$ and the axial direction $D_A$ as illustrated in FIG. 3, the U being oriented with the opening disposed in the axial direction $D_A$.

The second wall 2664 of the first reinforcement 266 comprises an orifice 2666 intended to be coaxial with the first orifice 263 of the second portion 262 of the external platform 26 and through which the centering lug 90 passes. The second wall 2674 of the second reinforcement 267 comprises an orifice 2676 intended to be coaxial with the second orifice 264 of the second portion 262 of the external platform 26 and through which the screw 95 passes, the nut 96 bearing on a radially inner surface of the second wall 2674 of the second reinforcement 267.

The first and second reinforcements 266 and 267 can be added during the consolidation phase through gaseous process or during the "Melt Infiltration" operation and thus secured to the ring sector 20.

In the first embodiment illustrated in FIGS. 1 to 4, the ring sector 20 further comprises a notch 29 made in the second portion 262 of the external platform 26 and in the second wall 2664 of the first reinforcement 266, and the outer metal shroud 9 comprises, for each ring sector 20, an abutment 94 configured to cooperate with the notch 29 of the external platform 26 of the ring sector 20. The notch 29 extends in a plane comprising the axial direction $D_A$ and the circumferential direction $D_C$ and the abutment 94 extends in a plane comprising the axial direction $D_A$ and the radial direction $D_R$.

In addition, the first portion 261 of the external platform 26 comprises a main portion 2610 defining an outer wall of the flowpath 45 of the gas stream F and a radial portion 2615 protruding in the radial direction $D_R$ outwardly from an upstream axial end 2611 of the first portion 261.

Figure 5:
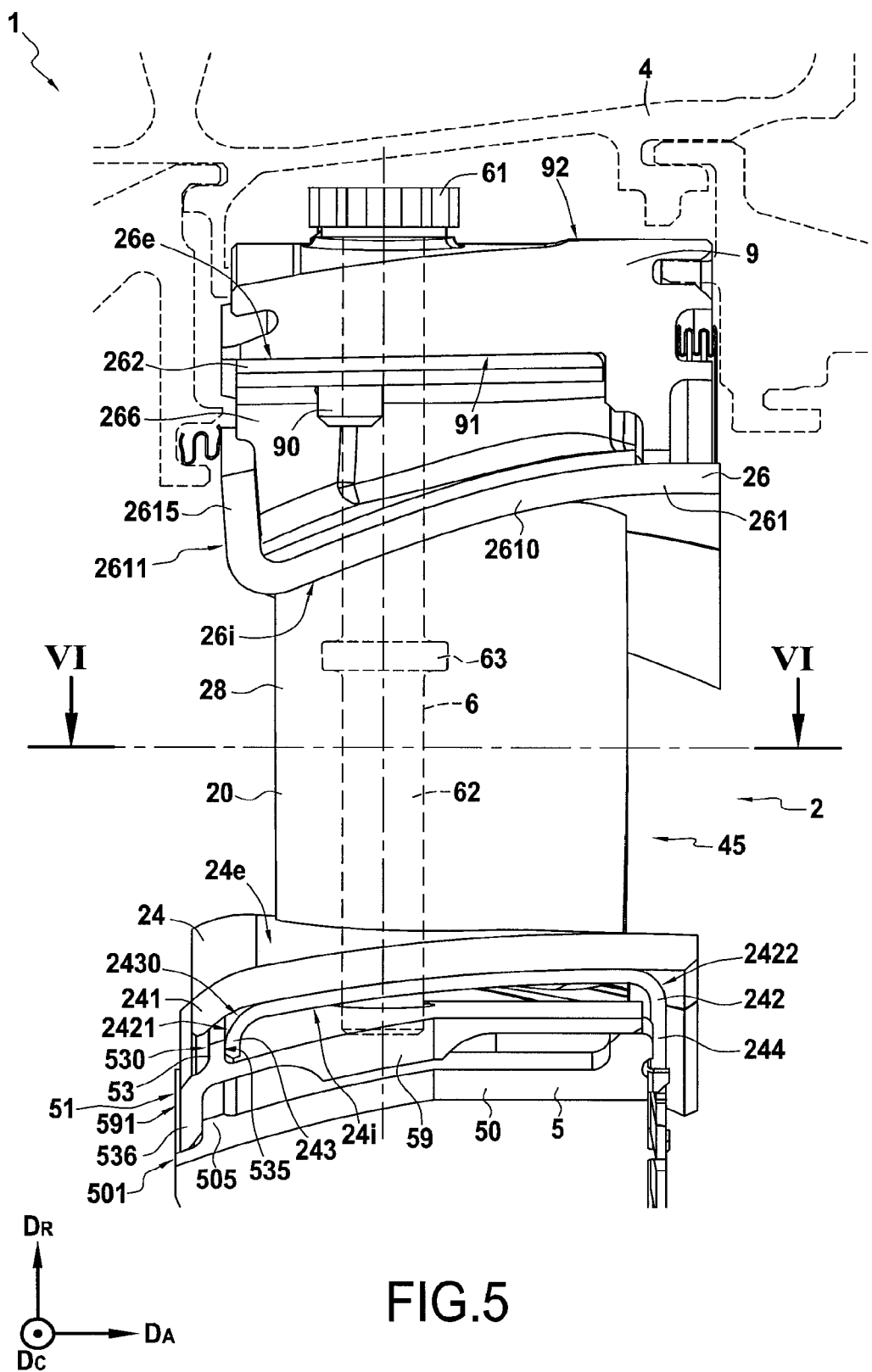
FIG. 5 is a schematic view of a ring sector of a nozzle stage in a plane defined by the radial direction and the axial direction of the ring according to a second embodiment of the invention.

FIG. 5 illustrates a schematic view of a ring sector of a nozzle stage in a plane defined by the radial direction and the axial direction of the ring according to a second embodiment of the invention.

Figure 6:
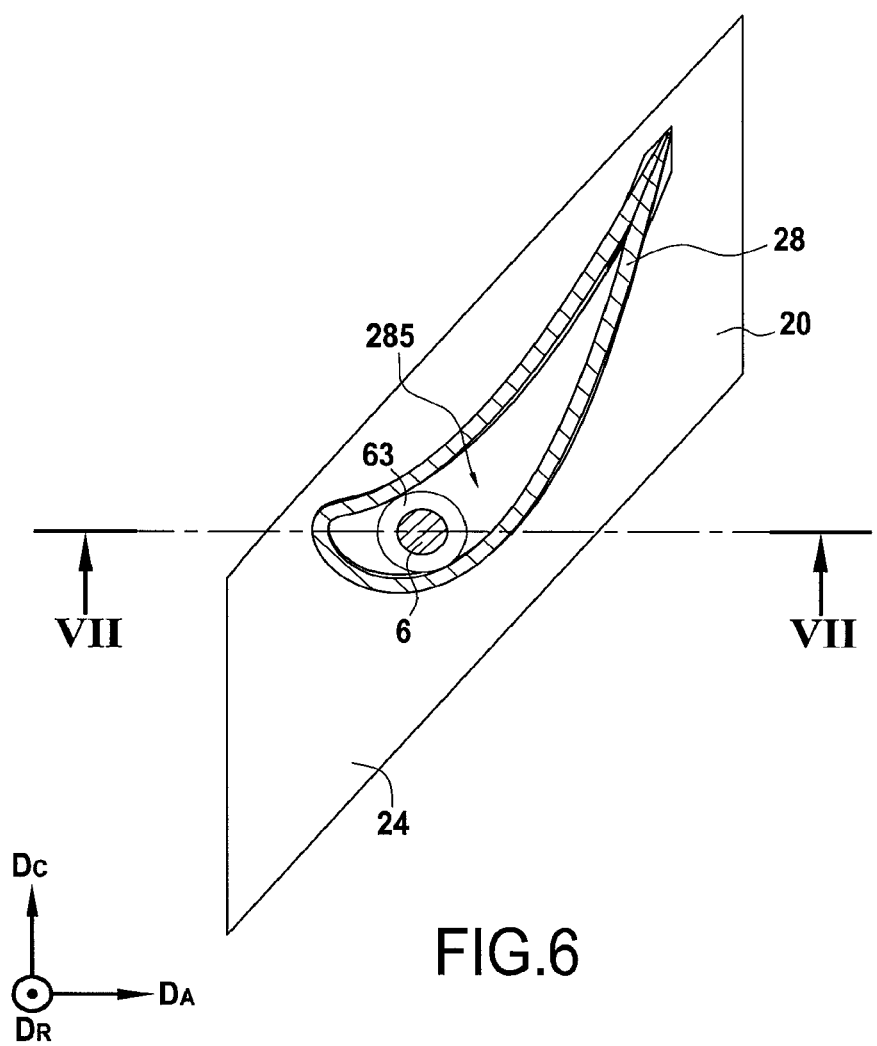
FIG. 6 shows a sectional view of the ring sector of FIG. 5 in a plane defined by the axial direction and the circumferential direction of the nozzle stage.
Figure 7:
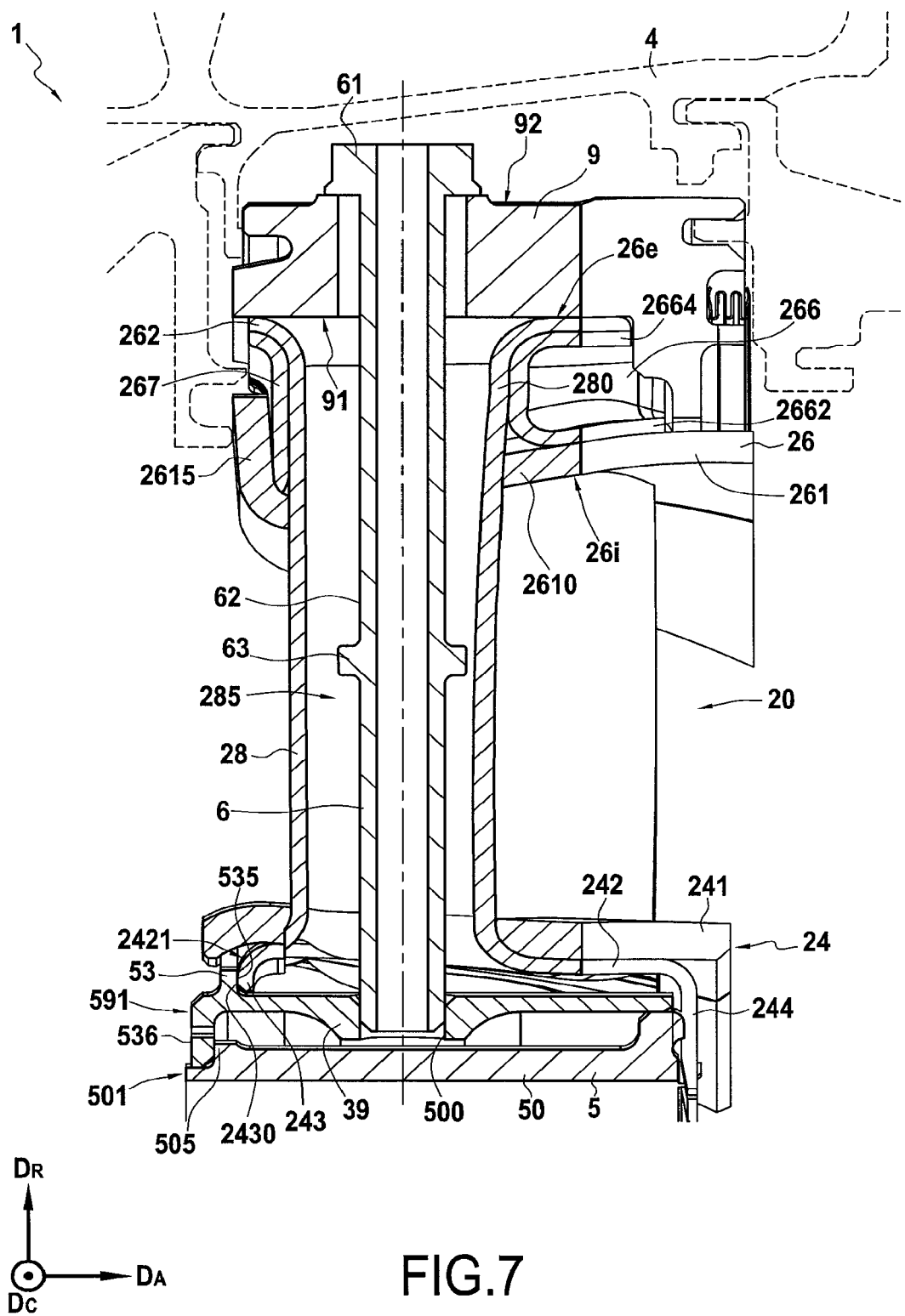
FIG. 7 shows a schematic sectional view of the ring sector of FIG. 5 in a plane defined by the radial direction and the axial direction.
Figure 8:
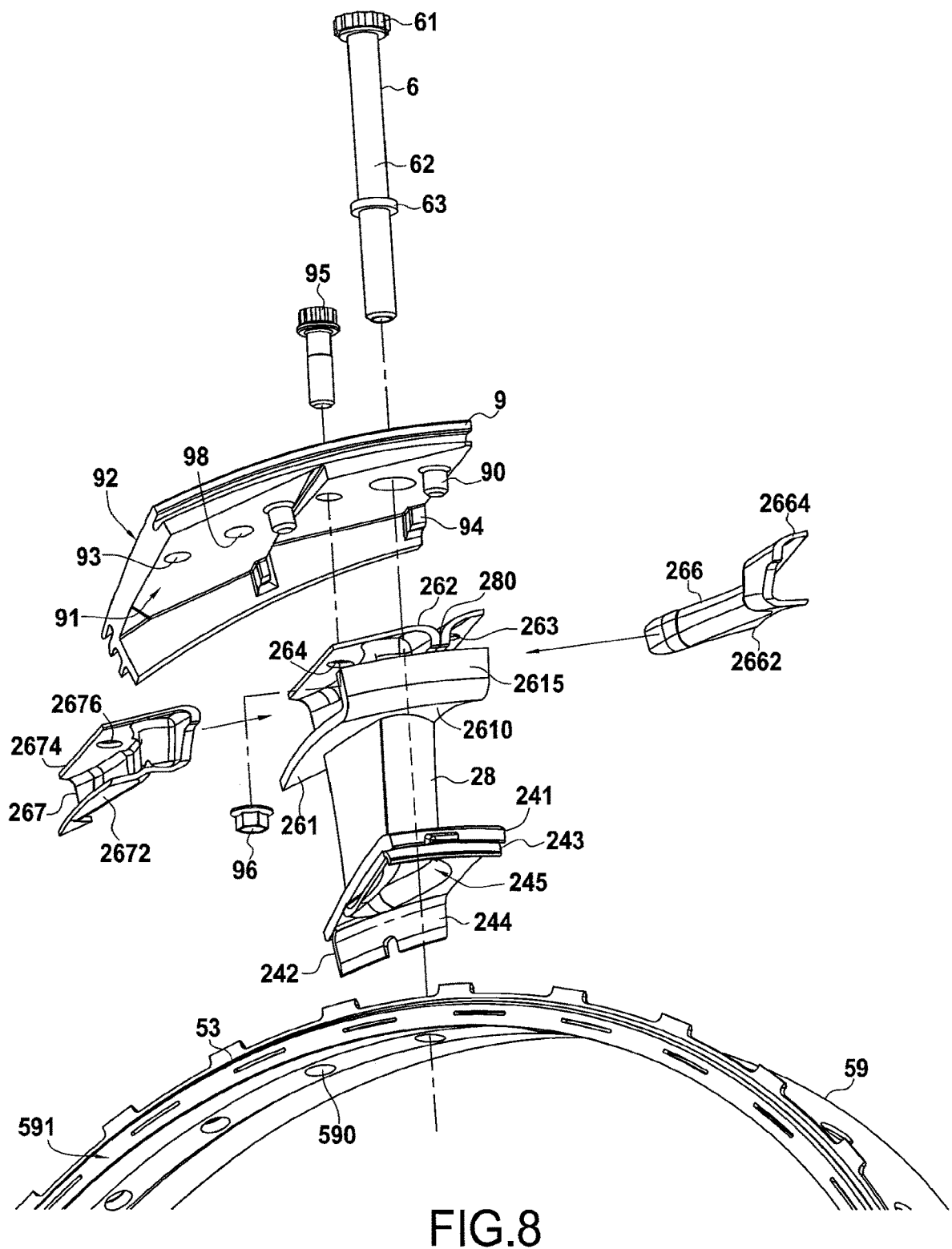
FIG. 8 is an exploded schematic view of the ring sector of FIG. 5.

FIGS. 6 to 8 show respectively a sectional view in a plane defined by the axial direction and the circumferential direction, a schematic sectional view in a plane defined by the radial direction and the axial direction and a schematic exploded view of the ring sector of FIG. 5.

The elements identical to the second embodiment illustrated in FIGS. 1 to 4 bear the same numerical references.

The second embodiment differs from the first embodiment in that the inner support shroud 5 comprises a support crown 50 and a retaining crown 59 disposed around the support crown 50.

The retaining crown 59 comprises orifices 590 configured to receive the masts 6. The retaining crown 59 further comprises an upstream attachment tab 53 extending in the radial direction $D_R$ outwardly from an upstream axial end 591 of the retaining crown 59, that is to say towards the internal platform 24, and more particularly its internal surface 24i, of the ring sector crown 20, and towards the outer metal shroud 9. The downstream surface 535 of the upstream attachment tab 53 is bearing against the upstream end 2421 of the second portion 242 of the internal platform 24 of the ring sector 20, and more particularly against an upstream surface 2430 of the upstream tab 243 protruding from the upstream end 241 of the internal platform 24.

The retaining crown 59 also comprises an upstream radial retaining flange 536 extending in the radial direction $D_R$ inwardly from the upstream end 591 of the retaining crown. The upstream radial retaining flange 536 is bearing in the axial direction $D_A$ against a shoulder 505 extending in the radial direction $D_R$ outwardly from an upstream axial end 501 of the support crown 50.

The invention thus provides a turbine of a turbo engine comprising a CMC turbine nozzle stage whose mounting is simplified and adapted to hold the ring sectors in a deterministic manner while allowing the ring sector to be deformed independently of the metal parts at the interface.

The invention claimed is:
1. A turbine of a turbo engine comprising:
a casing; and
a turbine nozzle stage, the turbine nozzle stage including
an outer support shroud made of metal and secured to the casing, an inner support shroud made of metal, and
a plurality of ring sectors made of ceramic-matrix composite material forming a crown and extending between the outer support shroud and the inner support shroud, the ring sectors defining an axial direction and a radial direction, and each ring sector having
an internal platform and an external platform which delimit a fluid flowpath, and
at least one blade extending between the external platform and the internal platform and fixed thereto,
the external platform of each sector comprising
a first portion equipped with an inner face which delimits the fluid flowpath, and
a second portion radially distant and external to the first portion, the second portion of the external platform abutting and being fixed to the outer support shroud,
the internal platform comprising
a first tab protruding along the radial direction inwardly from an upstream axial end of the internal platform, and
the inner support shroud comprising a shoulder protruding in the radial direction outwardly, the shoulder being positioned upstream of the first tab and in abutment in the axial direction against said first tab,
wherein said turbine further comprises at least one reinforcement disposed along the radial direction between the first portion of the external platform and the second portion of the external platform, said at least one reinforcement comprising
a first wall bearing against a radially outer face of the first portion of the external platform, and
a second wall bearing against a radially inner face of the second portion of the external platform, said at least one reinforcement being fixed to the outer support shroud with the second portion of the external platform, and
wherein the first portion of the external platform comprises a radially extending portion protruding outwardly in the radial direction from an upstream end of the external platform, and the at least one reinforcement abuts against a downstream face of the radially extending portion in the axial direction.

2. The turbine according to claim 1, wherein the second portion of the external platform is fixed to the outer support shroud using at least one assembly comprising a screw and a nut, the screw passing through the external platform of the sector and the outer support shroud.

3. The turbine according to claim 1, wherein the second portion of the external platform of each sector comprises at least one rotational abutment element and the outer support shroud comprises at least one complementary rotational abutment element configured to cooperate with a rotational abutment element of the external platform.

4. The turbine according to claim 1, wherein said at least one blade of each ring sector has a hollow profile defining an inner housing extending between the internal platform and the external platform, the internal and external platforms of each ring sector each have an orifice communicating with said inner housing of said at least one blade, and each ring sector of the nozzle stage comprises at least one mast passing through said orifices of the platforms and the inner housing of said at least one blade, said mast being fixed to said casing and in connection with said sector and said inner support shroud.

5. The turbine according to claim 4, wherein the mast comprises at least one portion protruding in the axial direction in connection with the blade to hold the blade in position.

6. The turbine according to claim 1, wherein the internal platform of each sector further comprises a second radial tab protruding in the radial direction inwardly from a downstream end of the internal platform, the internal platform being fixed to the inner support shroud by pinching of the first and second radial tabs of the internal platform in the axial direction between said shoulder of the inner support shroud and a clamp including two jaws extending in the radial direction outwardly and held towards each other against the second radial tab of the internal platform.

7. The turbine according to claim 4, wherein the inner support shroud comprises a perforated crown including orifices for receiving one end of the mast, and a retaining ring on which the crown is mounted.

8. The turbine according to claim 4, wherein the mast is hollow.

9. The turbine according to claim 1, wherein the second portion of the external platform, the blade and the first tab of the internal platform are formed in a single and same composition part of ceramic-matrix composite material.

10. The turbine according to claim 1, wherein each reinforcement further comprises a central wall extending between the first wall and the second wall of the corresponding reinforcement, in the radial direction, each reinforcement having a U shape in a section plane comprising the radial direction and the axial direction with an opening disposed in the axial direction.

11. A turbo engine comprising at least one turbine of a turbo engine according to claim 1.

* * * * *